United States Patent [19]
Campbell et al.

[11] Patent Number: 5,817,361
[45] Date of Patent: Oct. 6, 1998

[54] DOUGH PROCESSING SYSTEM WITH BAKERY PAN INDEXER

[75] Inventors: Sterrett P. Campbell, 995 Peachtree Dunwoody Ct., Atlanta, Ga. 30328; Paul Samuel Zerwekh, Elliston, Va.

[73] Assignee: Sterrett P. Campbell, Atlanta, Ga.

[21] Appl. No.: 650,182

[22] Filed: May 20, 1996

[51] Int. Cl.⁶ ........................................ A21D 6/00
[52] U.S. Cl. .................. 426/496; 426/503; 198/464.1; 198/464.2; 198/468.2; 198/468.5
[58] Field of Search ................................ 53/55, 498, 246, 53/251; 198/464.1, 464.2, 468.2, 468.5; 426/549, 496, 503; 99/443 C

[56] References Cited

U.S. PATENT DOCUMENTS

| | | | |
|---|---|---|---|
| 3,757,925 | 9/1973 | Luther | 198/37 |
| 4,008,025 | 2/1977 | Campbell | 425/96 |
| 4,306,850 | 12/1981 | Cummins | 425/332 |
| 5,264,232 | 11/1993 | Campbell | 426/503 |
| 5,270,070 | 12/1993 | Campbell | 426/503 |
| 5,283,074 | 2/1994 | Campbell | 426/496 |
| 5,356,652 | 10/1994 | Campbell | 426/503 |
| 5,476,035 | 12/1995 | Florindez | 99/443 C |

*Primary Examiner*—Jeffrey Stucker
*Attorney, Agent, or Firm*—Thomas, Kayden, Horstemeyer & Risley

[57] ABSTRACT

Bakery pans (10) are moved in edge-to-edge abutment along a dough processing line. The bakery pan indexer (36) (FIG. 5) includes a surface conveyor having an array of magnets mounted thereon. The magnets firmly attach themselves to the lower surfaces of the bakery pans (10) and positively control the movement of the pans through the dough ball delivery station (37), where the dough balls (25) are delivered to the dough receiving cavities (35) of the pans. The pans are maintained in constant motion, and the pans are accelerated and decelerated in order to compensate for the varying distances between the rows of dough receiving cavities of the pans.

19 Claims, 12 Drawing Sheets

DOUGH PROCESSING SYSTEM WITH BAKERY PAN INDEXER

FIELD OF THE INVENTION

The invention disclosed herein relates to a process of dividing a mass of dough into dough balls, moving the dough balls through several processing stations to form the dough into rolls, hamburger buns, hotdog buns, etc. and delivering the formed dough pieces to the cavities of pans which will be transported through a final proofer and oven for baking the dough.

BACKGROUND OF THE INVENTION

In the mass production of hamburger buns, hotdog buns, rolls, etc. in an industrial bakery, dough is prepared in a mixer and dispensed to a dough pump where it is pumped to a dough divider. The dough divider divides the dough received from the pump into several streams that flow through separate channels in the divider housing. Divider blades are positioned at the dough outlets of the divider and are oscillated downwardly across the outlets of the dough channels so as to simultaneously sever pieces of dough from the channels. The pieces of dough drop to a belt conveyor system and are moved simultaneously in columns and rows against rounder bars where the dough pieces are rolled and formed into balls. This creates a stream of dough balls, with the dough balls moving in longitudinal columns along a processing path, with the balls arranged in lateral rows.

The stream of dough balls continues to move on through the system in columns and rows where the dough balls develop a firm outer skin and the dough is further processed into a shape consistent with the final product to be made, such as a hamburger bun, a hotdog bun or a brown and serve roll. Eventually, the dough balls, after having been shaped as necessary into pieces of dough which are consistent with the shape of the final baked product, are placed in the cavities of baking pans, with the cavities being shaped so that when the pans have moved through an oven the cavities have helped form the dough pieces into the desired shape of a roll, hamburger bun, hotdog bun, etc.

In the meantime, the baking pans which have the dough receiving cavities are assembled in end-to-end abutment and are moved along a pan path so as to intersect the processing path of the dough balls. Each pan is of a similar configuration, having several cavities formed in a row of cavities across the pan and with the cavities also formed in columns of cavities along the pan. The dough balls are formed into the appropriate shape just prior to being delivered to the baking pans, and the shaped dough balls or pieces and the baking pans are brought together at a delivery point so that all of the shaped dough balls are delivered to and are received in the cavities of the baking pans. In some systems the speed of the system is as high as 125 cycles per minute, in that the dough divider blades oscillate fast enough to form 125 rows of dough balls per minute.

One of the problems of the prior art dough processing equipment is to move the baking pans through the dough delivery station at the same speed as the shaped dough balls are delivered, with each cavity being placed exactly at the delivery station upon the delivery of the dough balls. In some instances, the dough receiving cavities in a baking pan are arranged in clusters of four having low sidewalls so that when the dough is baked, the configuration of the dough pan forms four buns in a connected cluster. Usually this means that the four cavities for each cluster will be close together, and the cavities of each cluster will be farther spaced apart from the adjacent cavities of another cluster. Therefore, some baking pans have cavities that are not equally spaced from one another. Further, the typical baking pan has an upstanding edge around its perimeter. When pans are placed in abutment and moved through the delivery station where the shaped dough balls drop into the cavities, the distance between the last row of cavities of one pan to the first row of cavities of the next oncoming pan may be different from the distances between the cavities of one pan.

With the distances between dough receiving cavities of the baking pans moving through the dough delivery station being unequal, the movement of the pans through the dough delivery station must be carefully controlled to present the next oncoming row of cavities at the delivery station at the proper time to receive the shaped dough balls.

In the past, the positions of the baking pans at the dough delivery station were controlled by the use of a series of retractable timing arms placed in the path of an oncoming pan. If the pan was ahead of schedule, the first timing arm would be engaged by the leading edge of an oncoming pan so as to stop the pan with its first row of cavities positioned at the dough delivery station. Once the first row of shaped dough balls was delivered to the first row of dough receiving cavities of the pan, the first timing arm would be lifted out of the way of the pan, and the pan would then continue to move with the surface conveyor. If the surface conveyor moved the second row of cavities to the dough ball delivery station too soon, the leading edge of the pan engaged a second timing arm which was spaced so that the second row of dough receiving cavities would be stopped at the dough delivery station. After the second row of cavities had received their dough balls, the second timing arm would be retracted upwardly out of the way to allow the pan to move with the conveyor belt toward the third and subsequent timing arms and the process would continue. The timing arms would be spaced apart at intervals that corresponded to the spacing of the dough receiving cavities of the pans, and the timing arms would be lifted at intervals which were timed with respect to the delivery of the shaped dough balls to the cavities, which resulted in the rows of cavities being positioned at the right time and the right place to receive the oncoming dough balls.

Ideally, the pans would stop with each row of dough receiving cavities positioned exactly at the delivery station of the dough balls, and the dough balls should drop down into the cavities. However, when the rate of production of the system is increased, there is not enough time to stop the pans so that each row of dough receiving cavities is stopped at the dough delivery station.

If the pan conveyor velocity is matched with the velocity of the oncoming dough balls so that the pans travel at a velocity that enables the second of adjacent rows of pan cavities which are spaced farthest apart to be filled with dough balls without stopping the pan, it is typical that the baking pans would be stopped only when the distance between adjacent dough receiving cavities was short, so that a typical pan would be stopped only once or twice as it passed beneath the dough ball delivery station. This, however, creates another problem. The shaped dough balls tend to overshoot a pan cavity when the pan is not moving, or undershoot a pan cavity when the pan is moving. This results in the dough balls being positioned in non-uniform positions in the cavities, and the baked products will not be uniformly shaped.

As the speed of operation of the system increases, the problem increases, in that the dough balls become farther displaced in the dough receiving cavities of the baking pans.

Another problem with the use of the prior art timing arms is that the placement of the timing arms above the surface conveyor system that transports the pans is cumbersome and obstructs the operator's access to the filled pan should it be necessary to manually correct a problem.

SUMMARY OF THE INVENTION

Briefly described, the present invention comprises an improved method and apparatus for continually dividing dough pieces from a mass of dough and moving the dough pieces in parallel columns and in rows through a processing path in which they are formed into balls which are processed into appropriate shapes and delivered in rows on a constant predetermined schedule at equal time intervals between the rows of dough balls at a dough delivery station where the shaped dough balls move downwardly into the dough receiving cavities of baking pans.

The baking pans are moved continuously, without stopping, through the dough delivery station. A magnetic surface conveyor is used to control the movement of the baking pans as they pass through the dough delivery station, and the magnetic surface conveyor is accelerated or decelerated so as to compensate for the variance in the spacing of the dough receiving cavities of the baking pans.

Baking pans of the same configuration are used in the system, and the configuration of the baking pans is entered in a computer program. A proximity switch is used to detect the leading edge of an oncoming baking pan and the computer accelerates and decelerates the magnetic surface conveyor so as to time the next oncoming row of dough receiving cavities of a pan with the delivery of a row of the shaped dough balls. With this arrangement, the baking pans are not intermittently stopped as they move through the dough ball delivery station, but the velocity of the baking pans is varied only slightly, usually not more than plus or minus 20%, depending on the configuration of the baking pans.

As a result of the improved timing of the movement of the baking pans through the dough ball delivery station, the dough balls are substantially uniformly positioned in the dough receiving cavities of the pans, even when the cavities are not uniformly spaced apart from one another. This new pan indexing system can be operated at a much higher velocity than the prior art systems while precisely delivering shaped dough balls in the dough receiving cavities of the baking pans.

Thus, it is an object of this invention to provide an improved method and apparatus for expediently and accurately delivering dough balls to the dough receiving cavities of baking pans in a continuous dough processing system.

Another object of this invention is to provide a dough processing system which includes a pan indexing system for continuously moving baking pans through a dough delivery station with the velocity of the baking pans changing as necessary to compensate for the variation in spaces between the dough receiving cavities of the pans in order to place the dough receiving cavities of the pans precisely at the dough ball delivery station when the dough balls are delivered to the pans.

Another object of this invention is to provide an improved conveyor system for controlling the movements of baking pans as the baking pans move through a dough delivery station, so as to expediently and accurately receive the shaped dough pieces in the cavities of the baking pan.

Another object of this invention is to provide a computer controlled pan indexing system for a bakery line, whereby the movements of metal baking pans are positively controlled by a magnetic conveyor, and the magnetic conveyor carries the baking pans through a dough piece delivery station in timed relationship with the delivery of dough pieces to the dough receiving cavities of the baking pans.

Other objects, features and advantages of the present invention will become apparent upon reading the following specifications, when taken in conjunction with the accompanying drawings.

DETAILED DESCRIPTION

Figure 1:
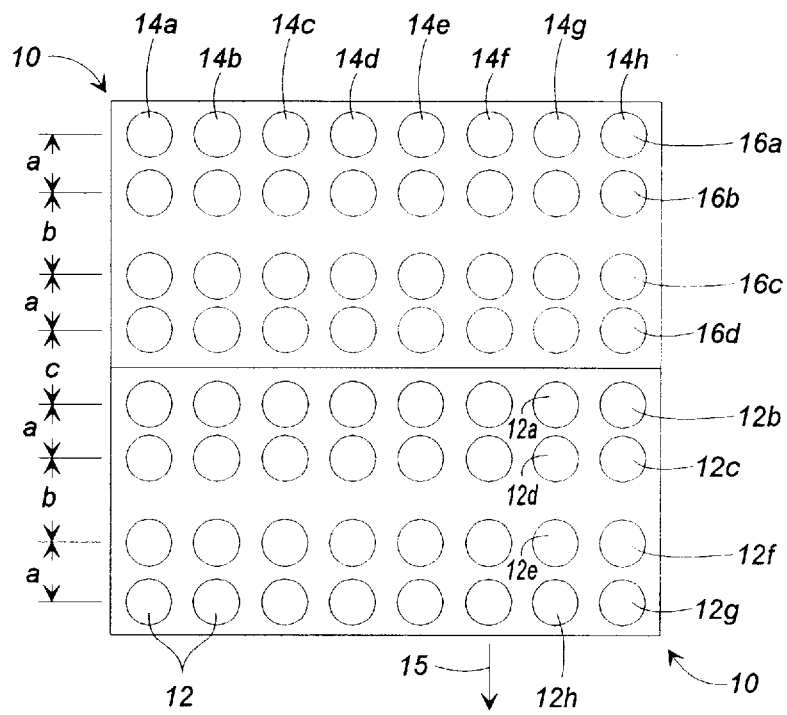
FIG. 1 is a plan view of two baking pans positioned in end-to-end abutment with one another, showing the variable spacing of dough receiving cavities of the baking pans.

Referring now in more detail to the drawings in which like numerals indicate like parts throughout the several views, FIG. 1 shows a pair of abutting bakery pans 10, each of which is made from a single sheet of material that includes a ferrous metal. An array of dough receiving cavities 12 are formed in each pan, with each cavity being of substantially identical size and shape. The cavities 12 are arranged in columns in each pan, with the number of columns of the pans matching the number of streams of dough that will be processed by the dough processing system. In the embodiment illustrated, the pans 10 each have eight columns 14a–14h which are intended to extend parallel to the direction of movement of the pans, as indicated by arrow 15. Further, the cavities 12 are arranged in rows, with each pan including four rows of cavities 16a–16d. Further, the cavities 12 of the pans 10 are arranged in clusters of four, with the cavities of each cluster being spaced close together and spaced slightly farther away from the cavities of the next adjacent cluster. For example, cavities 12a, 12b, 12c and 12d are placed close together and form a cluster of cavities, whereas cavities 12e, 12f, 12g and 12h form another cluster of cavities. The cavities of the cluster 12a–12d are spaced farther apart from the cluster of cavities 12e–12h than from each other along the length of the pan. This is indicated by the letters a and b at the left of FIG. 1. Further, the spacing between the row cavities at one edge of one pan to the row of cavities at an edge of the next adjacent pan, indicated by c, may be different from any of the other spacings between the cavities along the lengths of the pans. Therefore, when a multiple number of the duplicate pans 10 are placed in abutment, an array of cavities 12 is formed with unequal spacing between some of the rows of cavities.

While bakery pans 10 are illustrated to show the unequal spacing of dough receiving cavities in baking pans, it will be understood that baking pans of other configurations also are used in dough processing systems.

Figure 2B:
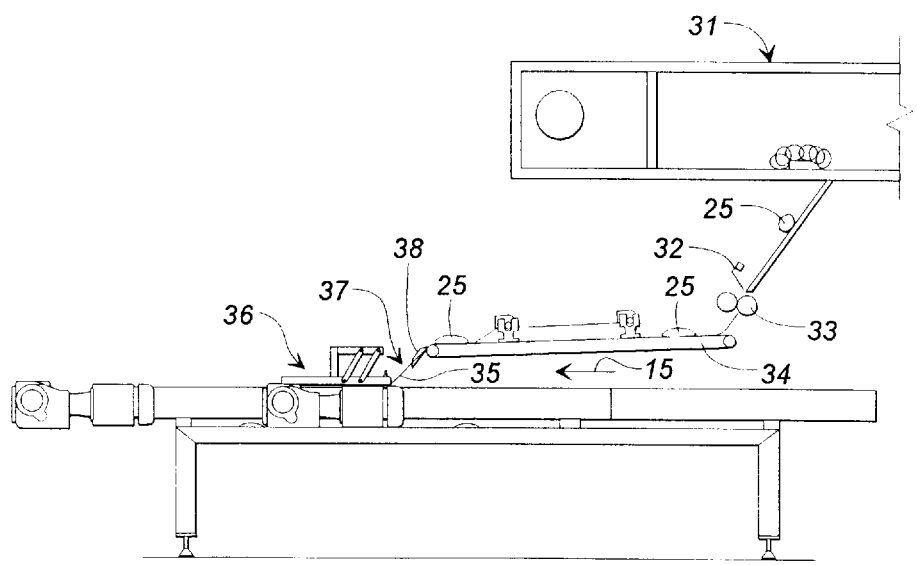
FIGS. 2A and 2B are schematic illustrations of a dough delivery system, illustrating the processing of the dough from the mixer, to the pans and toward the oven.
Figure 2A:
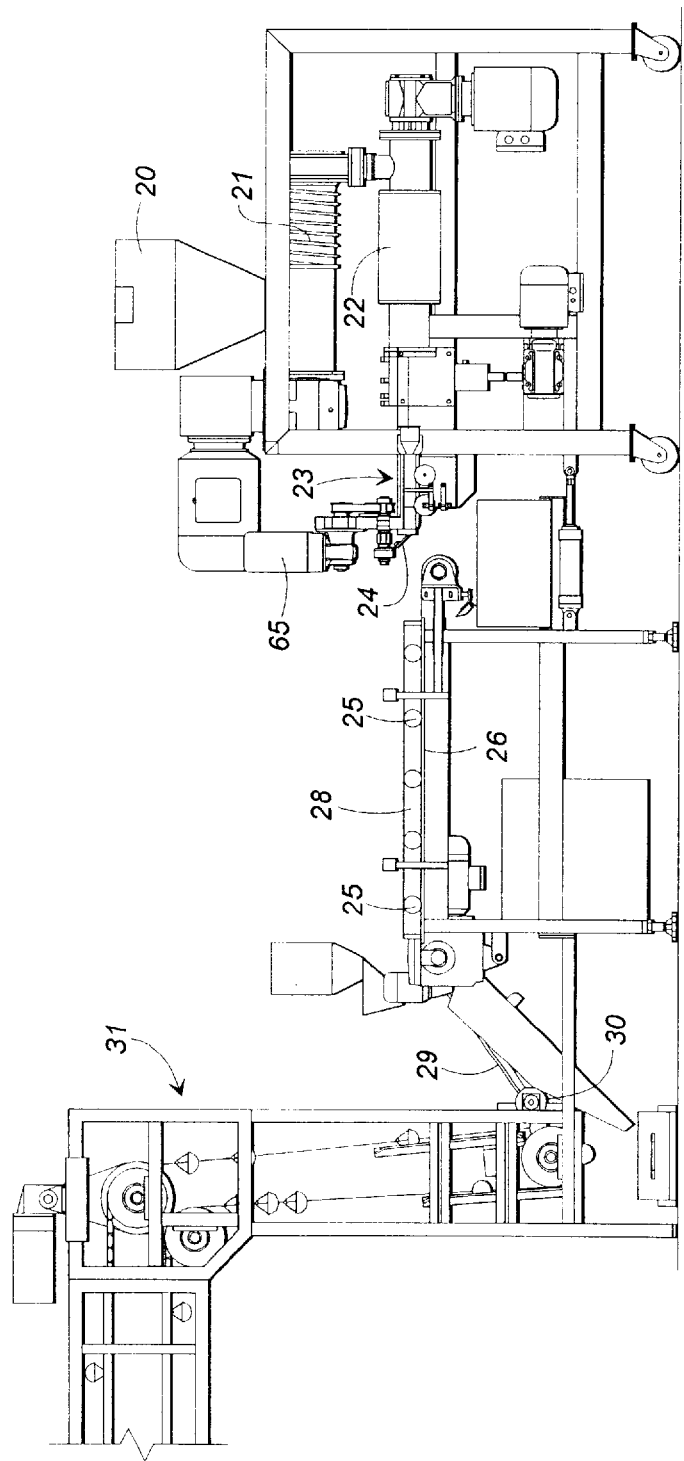

FIGS. 2A and 2B of the drawings schematically illustrate a portion of a dough processing system, wherein dough from a mixer is deposited in the hopper 20 of dough pump 21, and the dough is pumped by the dough pump through a stuffing pump 22 to the dough divider 23. Examples of dough pumps and dividers are found in U.S. Pat. Nos. 5,046,940, 5,264,232, 5,270,070, 5,283,074 and 5,356,652.

Dough divider 23 divides the single stream of dough received from dough pump 21 into multiple streams, with the streams being directed through channels formed in the divider. For example, the single stream of dough received from dough pump 21 is divided into eight streams of dough flowing through eight channels. The dough streams then emerge through the eight outlet openings of the divider 23, and divider blades 24 sweep across the openings and divide the oncoming streams of dough, forming eight dough pieces 25 which simultaneously fall in a row to rounder bar surface conveyor 26.

The rounder bar conveyor 26 maintains the dough pieces moving in longitudinal columns and lateral rows as the dough pieces move into contact with rounder bars 28 supported over the rounder bar surface conveyor 26 and the dough pieces are rounded into dough balls 25. Examples of rounder bars are found in U.S. Pat. Nos. 4,008,025, 4,306,850 and 5,270,070.

The dough balls 25 then pass through other processing equipment, such as a zigzag 29, rotary timer 30, intermediate proofer 31, drop out chute timing gate 32, through the sheeter rollers 33 which reshapes the dough balls, molder belt 34 and down the pan loading chute 35 to the pan cavity that is being controlled by the pan indexer 36. The timing gate 38 delivers the dough pieces 25 at delivery station 37 which is at the lower edge of the inclined loading chute 35 and immediately above the pan path 15. The specific time of arrival of the row of dough pieces into the pan cavities is adjusted to cause the dough pieces to arrive at the proper time by setting the speed of the molder belt. The dough pieces 25 are released by the timing gate 35 so as to drop into the dough receiving cavities 12 of the line of bakery pans 10. The pans, with the dough balls 25 received therein, pass through an open ended final proofer and oven (not shown), and the dough balls emerge from the oven in a baked condition.

Figure 5:
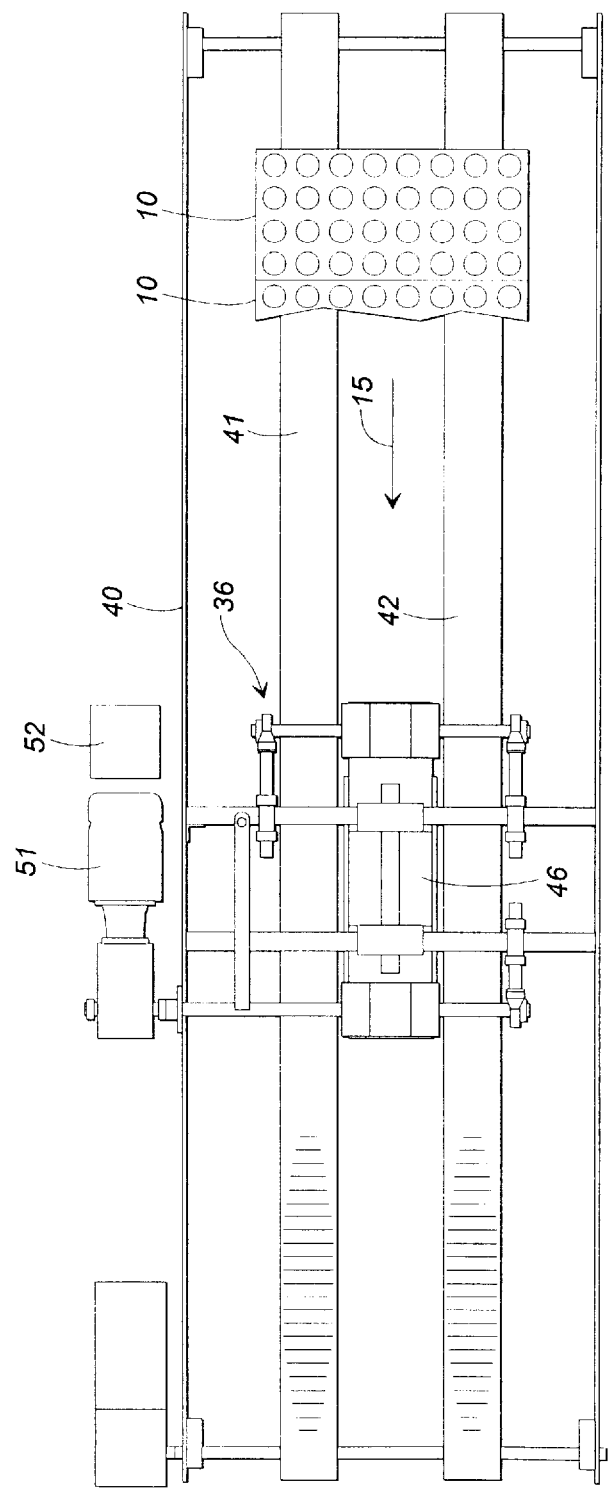
FIG. 5 is a plan view of the pan indexer of FIG. 3 showing baking pans approaching the pan indexer.

As illustrated in FIG. 5, the pan indexer 36 is integrated into surface conveyor 40 which delivers the baking pans 10 in end-to-end abutment to the pan indexer and carries the pans along a pan path 15 and on toward the baking oven (not shown). The surface conveyor 40 includes a pair of parallel surface conveyor units 41 and 42. The parallel surface conveyor units 41 and 42 are known as table top conveyors, with each conveyor unit forming a longitudinal support surface on which the bakery pans 10 travel. The bakery pans 10 are placed in edge-to-edge abutment, so that, ideally, there are no gaps between the bakery pans as they approach pan indexer 36.

Figure 3:
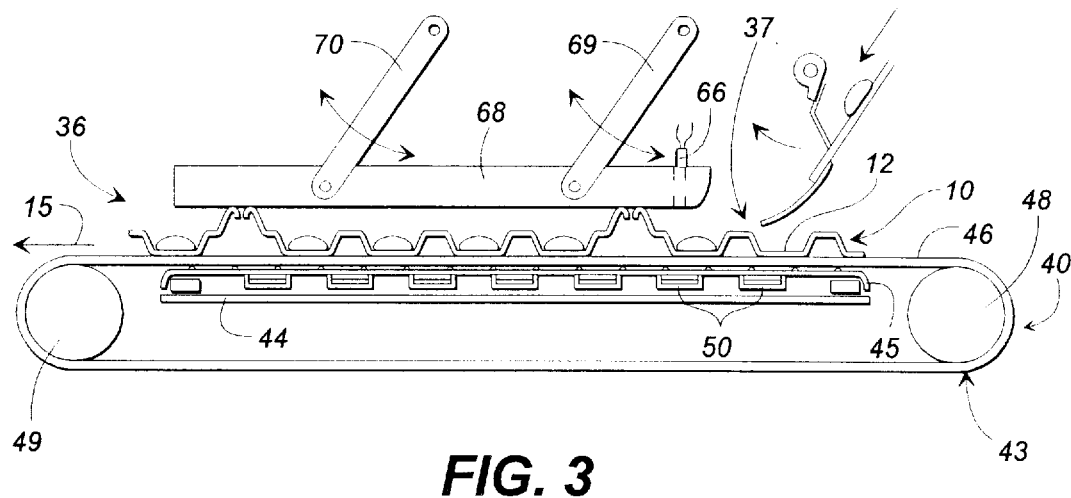
FIG. 3 is a side view of the pan indexer.
Figure 4:
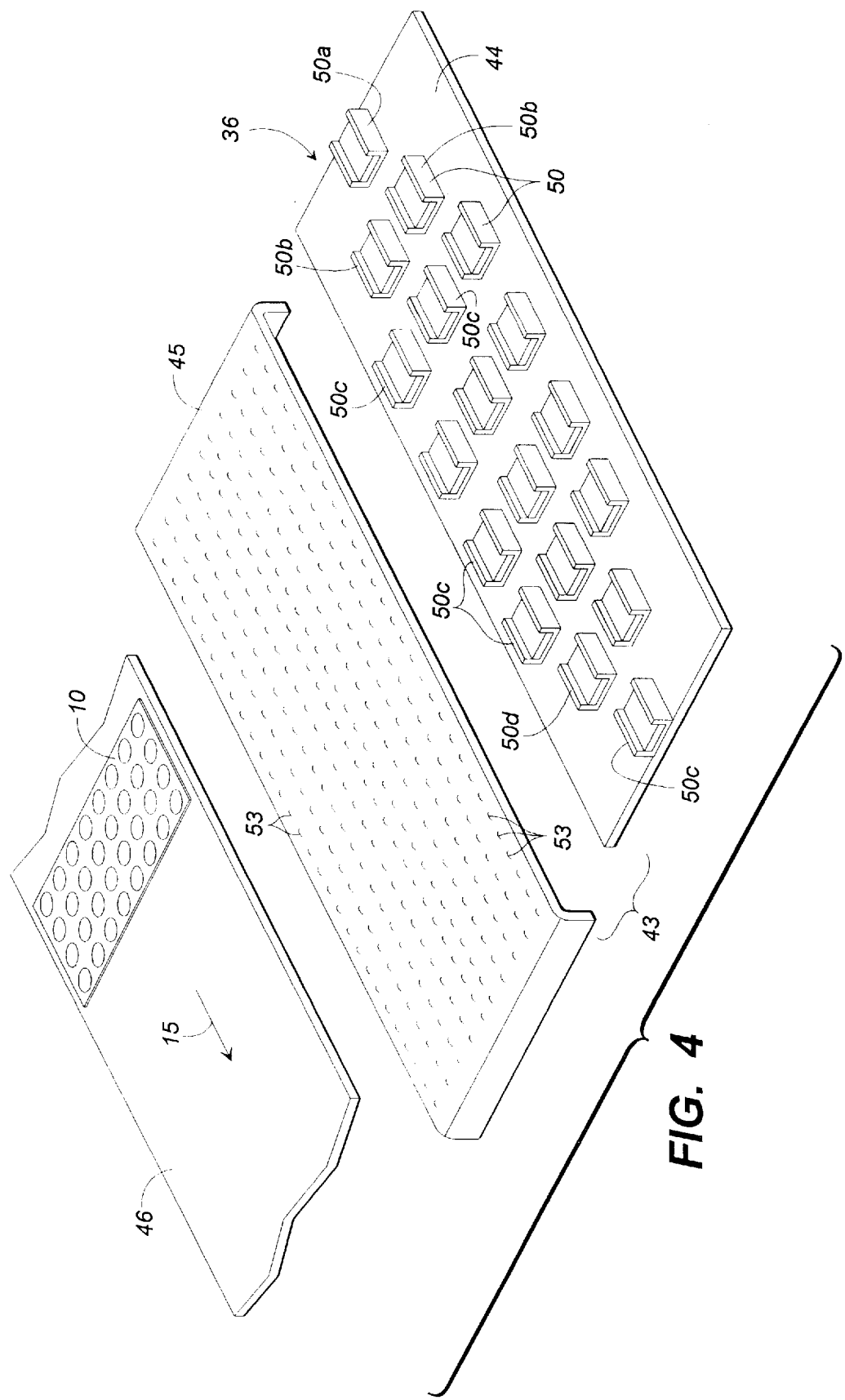
FIG. 4 is an expanded perspective view of a portion of the pan indexer of FIG. 3.

As shown in FIGS. 3 and 4, pan indexer 36 includes a magnet conveyor 43 which includes a magnet support table 44, a magnets cover 45 and conveyor belt 46. The conveyor belt extends around end rollers 48 and 49.

Magnet support table 44 includes a plurality of permanent magnets 50 mounted thereto. The magnets are arranged so that at the ends of the support table 44 there is a smaller number of magnets, and then the magnets are arranged in a thicker cluster toward the center of the table. For example, there is a single magnet 50a at the entrance end of the table. In the next row of magnets, there are two magnets 50b. In the third row there are three magnets 50c, so that there are more magnets near the intermediate portion of the support table. Likewise, near the exit end of the support table, there are two magnets 50d in the next to last row, and a single magnet 50e in the last row. Thus, it can be seen that there is a stronger magnet force applied at the intermediate portion of the support table 44 than at its ends.

Magnets cover 45 is formed of a non-metallic, non-magnetizable material, and the magnets cover extends over the magnets 50. An array of protruding dimples 53 extend upwardly from the magnets cover over the entire upper surface of the magnets cover. An example of the material suitable for use as a magnets cover is RIGID-tex, 304 SS, pattern no. 6-WL, 0.024" thick, produced by Rigidized Metals Corp., Buffalo, N.Y., U.S.A.

Conveyor belt 46 extends over and contacts the dimples 53 of the magnets cover 45. By the conveyor belt contacting only the dimples 53 and not the flatter surface of the magnets cover, a relatively small amount of friction is created between the stationary magnets cover and the moving conveyor belt 46.

The conveyor belt 46 is fabricated so as to have its lower surface that faces the magnets cover 45 formed of a relatively coarse material that creates a minimum of sliding frictional contact between the belt and the magnets cover as the belt is moved with respect to the table. In contrast, the upper surface of the conveyor belt 46 which faces away from the magnets cover 45 is formed of a relatively slick material so as to have a relatively high sliding friction surface, so that the baking pans 10 will not easily slide with respect to the conveyor belt 46. An example of a suitable conveyor belt material is Transilon brand, E 8/2 VS/V5 STR/CL.

With the arrangement as illustrated in FIGS. 3–5, the baking pans 10 move along the table top conveyor belts 41 and 42 at a relatively high velocity until they reach the pan indexer 36. When the pans reach the pan indexer, the pan indexer conveyor belt 46 moves at a slower velocity than the table top conveyors 41 and 42, so that the pans received on the pan indexer are usually in end-to-end abutment (FIG. 5). As the pans 10 move on the pan indexer 36, the pans are progressively urged with increasing force downwardly against the conveyor belt 46 because of the progressively increased number of permanent magnets 50 that are arranged on the magnet support table 44, so that a progressive downward force is applied to the pans, both going onto and then traveling off of the pan indexer. This arrangement assures that the movements of the pans will not surge, as when moving onto the pan indexer, or when moving off of the pan indexer. For example, if a full force of the magnets was applied to the pans as the pans travel off of the pan indexer, the last pan in a line of pans, with no following pan, might tend to cling to the pan indexer because of the force applied by the magnets. On the other hand, since the force applied by the magnets tapers from a large force to a small force as the pans move off the indexer, the tendency for the last pan to cling to the indexer is substantially reduced. Magnet conveyor 43 is driven by the variable speed induction motor 51 and the speed of the motor is controlled by inverter 52.

Figure 6:
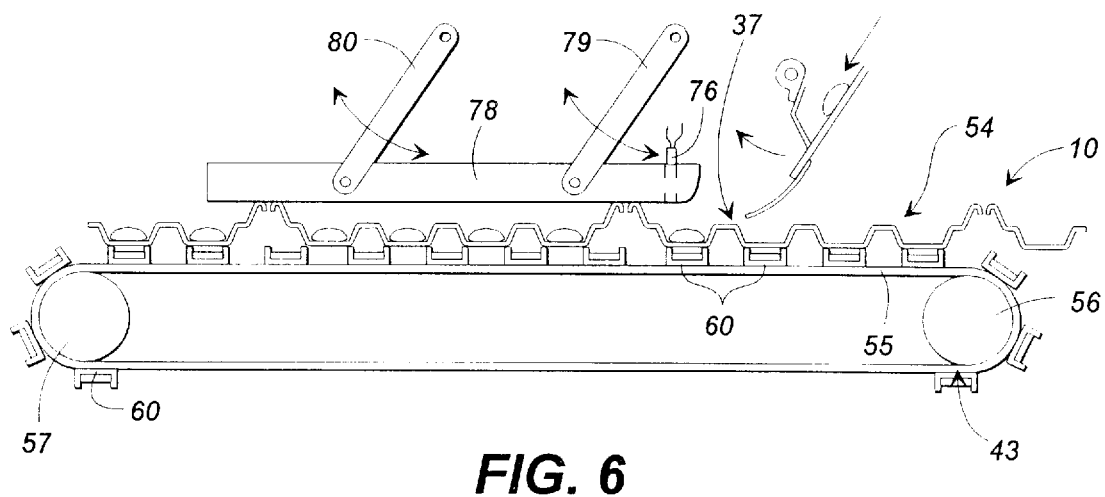
FIG. 6 is a side view of a second embodiment of a pan indexer.
Figure 7:
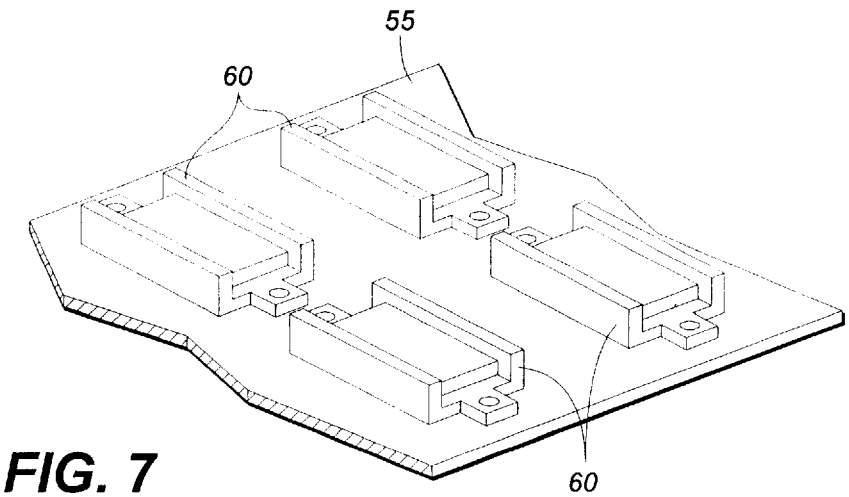
FIG. 7 is a detail perspective view of the conveyor belt of the pan indexer of FIG. 6.
Figure 8:
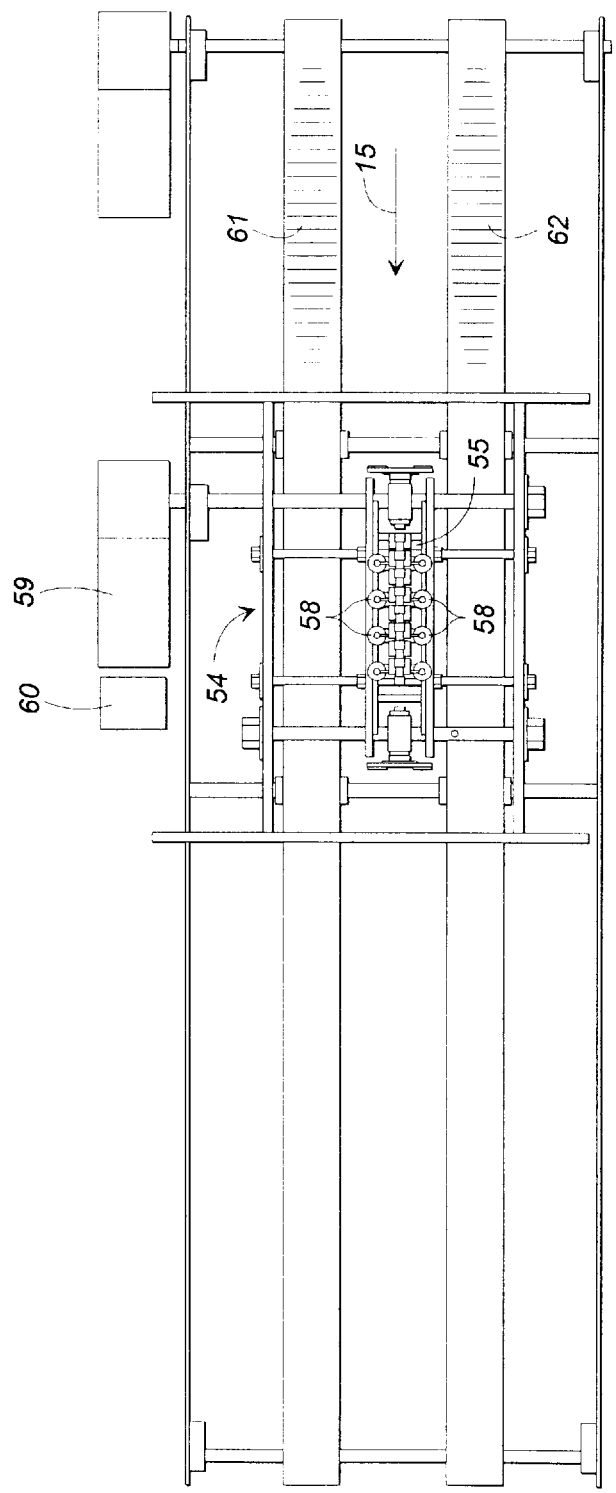
FIG. 8 is a plan view of the pan indexer of FIG. 6.

FIGS. 6, 7 and 8 show an alternate embodiment of the pan indexer conveyor system 34, wherein a continuous flexible belt conveyor 55 is mounted about end rollers 56 and 57. A plurality of permanent magnets are mounted to the surface of the belt conveyor. As shown in FIG. 8, the indexer conveyor is placed between table top conveyors 61 and 62. When the pans moving on the table top conveyor 61 and 62 approach the magnetic conveyor, the permanent magnets 60 make direct contact with the baking pan and positively control the movement of the pan as the pans move through the pan indexer. As before, the magnet conveyor of FIGS. 6–8 moves at a slower velocity than the table top conveyor, so that the pans moving onto the magnet conveyor will be in abutment with one another. Magnet conveyor 54 is driven by a variable speed induction motor 59 and the speed of the motor is controlled by inverter 60.

Typically, the surface conveyors which are associated with the magnet conveyors 43 and 54 will be driven at a surface speed up to 25% faster than the average surface speed of the magnet conveyors of the pan indexers. The pans usually will be placed on the surface conveyor in edge-to-edge abutment, and a continuous supply of the pans in edge-to-edge abutment will be delivered to the pan indexer. Since the pan indexer is magnetized, the pans will be attracted to the magnets and will be moved in unison with the magnet conveyor. In the meantime, the oncoming, potentially faster moving line of pans 10 will abut the pans being held by the magnetized conveyor of the pan indexer, so that the faster moving oncoming pans will be slowed to the same velocity as the pans being controlled by the pan indexer. In the meantime, the parallel table top conveyor units, such as 41, 42 of FIG. 5 or 61, 62 of FIG. 8, which operate at a higher surface velocity, will simply slide beneath the slower moving pans.

As indicated in FIG. 3, the pan indexer 36 includes a proximity switch 66 that is positioned over the path 15 of the bakery pans 10. Switch 66 is mounted in a floating support arm 68 that is supported by parallel linkages 69 and 70. The linkages 69 and 70 are long enough to place the floating support arm 68 in the path of the oncoming pans 10, and when the floating support arm 68 is engaged by a pan, the parallel linkages 69 and 70 allow the floating support arm to swing up out of the way and slide along the upper edges of the leading and trailing sidewalls of the pans. The floating support arm 68 is longer than the length of a pan 10, so that while it is urged downwardly by gravity it is held up by the edges of the pans moving therebeneath. This constantly places the proximity switch 66 adjacent the path of the upper edges of the pans 10, so that the switch 66 reliably detects the edge of an oncoming pan.

Likewise, as shown in FIG. 6, a similar proximity switch 76 is mounted in a floating arm 78 supported by parallel arms 79 and 80, so that the switch 76 will detect the leading and trailing edges of the pans 10 passing therebeneath.

Figure 9:
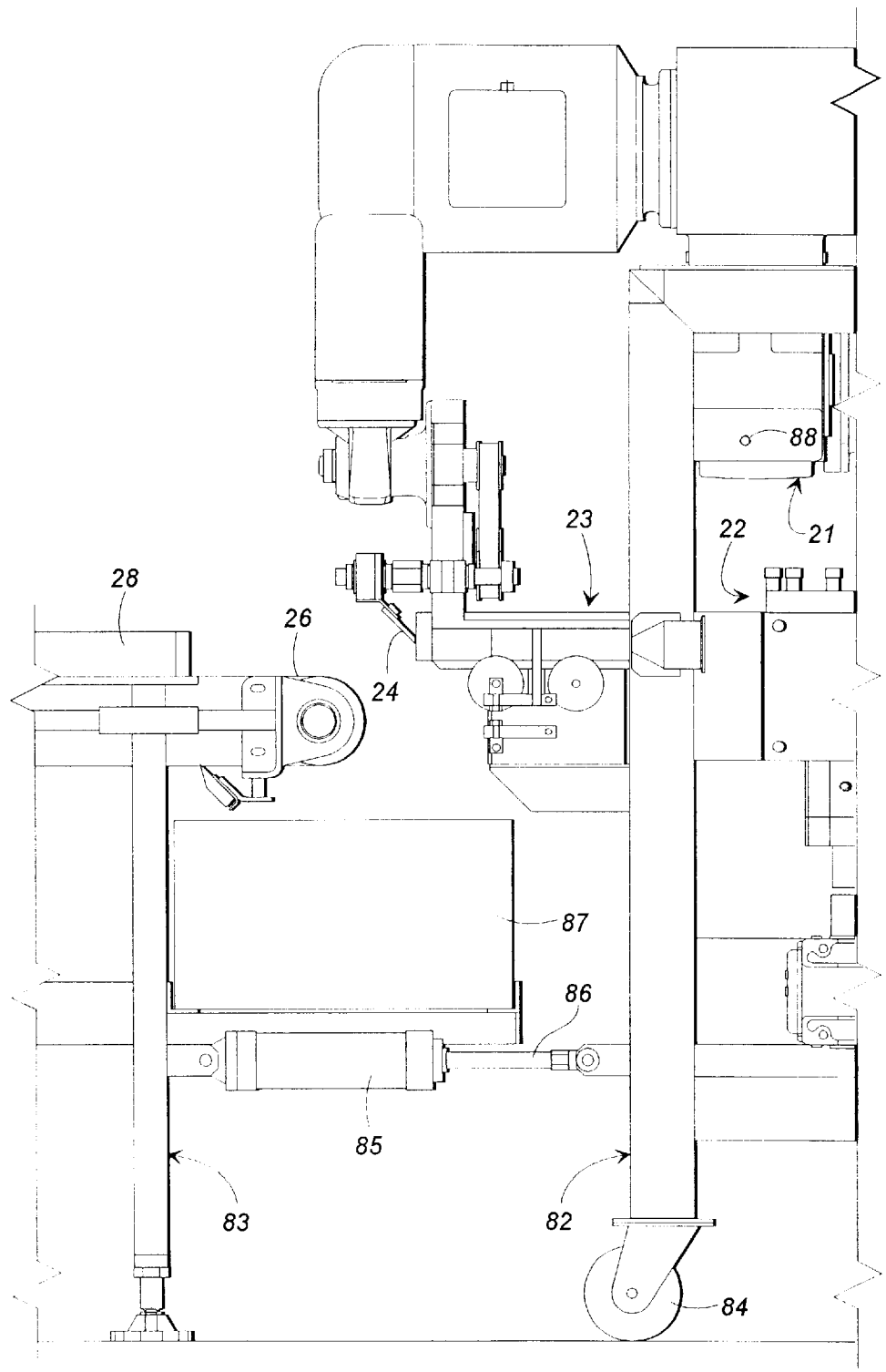
FIG. 9 is a side view of the movable connection between the dough divider and the rounder bars.

As illustrated in FIG. 9, a movable linkage is formed between the dough divider 23 and the rounder bar conveyor 26. The dough divider 23, together with the dough pump 21, stuffing pump 22 and their associated motors, supports, etc. are mounted on a portable frame 82. The frame is mounted on wheels 84, so that the frame and the elements that it supports can be rolled toward and away from the rounder bar conveyor 26 and the other elements downstream therefrom. An expansible chamber cylinder and rod assembly 85 is connected at its ends between the portable frame 82 of the dough divider 23 and the stationary frame 83 of the rounder bars. When the cylinder 85 and its rod are retracted, the portable frame 82 and its components roll toward the rounder bar assembly, and the dough pieces divided from the streams of dough fall to the rounder bar surface conveyor 26, for the normal operation of the system.

A waste collector 87 is mounted on frame 83 adjacent the entrance end of the surface conveyor 26 and directly beneath the divider blades 24 of the dough divider 23. As illustrated in FIG. 9, when the cylinder 85 and its piston 86 distend, moving the frame 82 away from the rounder bar conveyor 26, the dough balls being divided from the dough streams by the divider blades 24 will fall downwardly, directly into the waste collector 87.

A pressure sensor 88 is mounted in the stuffing pump 22 so as to continuously determine the pressure within the stuffing pump. When the pressure drops below a predetermined level, a switch (not shown) controlled by the pressure sensor 88 opens a pressure source into communication with the fluid actuated cylinder 85, causing the cylinder to distend, pushing the dough divider 23 away from the rounder bar conveyor 26 and causing the dough balls to fall from the dough divider 23 to the waste collector 87. Therefore, when the pressure of the dough is too low for the dough divider to divide the dough pieces at full size from the oncoming streams of dough, dough divider is pushed away from the rounder bar conveyor 26 and the dough balls bypass the rounder bar conveyor. Likewise, when the pressure rises in the stuffing pump so that dough pieces of the desired size are being divided by the dough divider, the switch again is actuated by the pressure sensor 88, causing the cylinder 85 and its piston 86 to retract and pull the dough divider 23 back into its proper delivery position, for delivering the correct sizes of dough pieces to the rounder bar conveyor 26.

CONTROL SYSTEM

The production of the dough balls 25 is a continuous operation, and when the dough divider 23 and its associated equipment are up to speed, rows of dough balls 25 are continually produced at substantially equal time intervals and moved on through the processing system at a rate of about one hundred and twenty-five rows of dough balls per minute, with each dough ball weighing about two ounces. The equipment downstream from the dough divider must be in timed relationship with the dough divider in order to properly receive and process the dough balls.

During the movement of the dough balls through the system, there are several areas where the movements of the dough balls are not accurately controlled. For example, during the movements of the dough balls through the rounder bars 28, the contact between the dough balls and the rounder bars may cause some of the dough balls to slow up slightly and become slightly out of alignment with the other dough balls in the same row. A similar alignment problem is sometimes experienced in the zigzag 29 and on the inclined pan of the timing gates 32.

In order to bring the dough balls back in timed relationship with the dough divider 23, the prior art rotary timer 30 collects the dough balls from the zigzag 29 and then simultaneously delivers all of the dough balls of a single row to the intermediate proofer 31. Likewise, the prior art timing gate 32 collects the dough balls 25 which may be slightly out of timed relationship, and releases all of the dough balls of a single row simultaneously at the delivery station at the pan indexer. The rotary timer and the timing gate are operated in timed relationship with respect to dough divider 23.

Although the dough balls are reliably delivered at constant intervals of time at the delivery station 37 to the bakery pans 10, the spaces between the dough receiving cavities 35 of the pans may not be equal. Therefore, in accordance with this invention, the bakery pans are accelerated when the spaces between the dough receiving cavities is larger than average, and are decelerated when the spaces between the dough receiving cavities is less than average, in order to make sure that the cavities reach the dough delivery station at the right instant. Further, the dough receiving cavities move continuously in the system so that the cavities are in motion when they receive the dough balls 25. Because the dough balls move in a downwardly inclined path as they are delivered to the cavities of the pans, the dough balls have a downward velocity component and a horizontal or forward velocity component as they approach their respective pan cavities. The pans 10 are moved at an average lateral velocity which usually is substantially equal to the lateral velocity component of the dough balls. Therefore, the relative movement of the dough balls with respect to the dough receiving cavities 12 is substantially vertical, so that there is no tendency of the dough balls to undershoot, overshoot or roll out of the dough receiving cavities 12.

Figure 10:
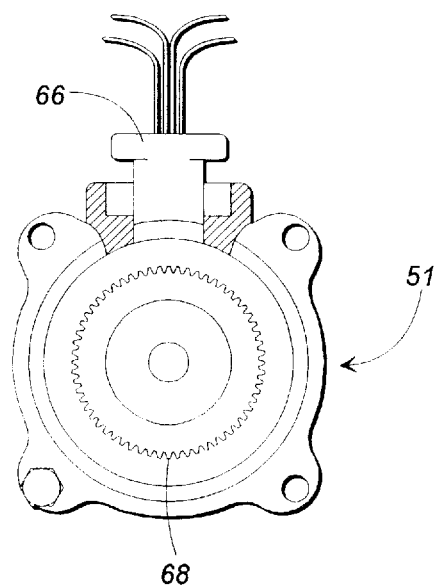
FIG. 10 is an end view of the motor of the magnetic conveyor, illustrating the gear teeth proximity switch.
Figure 12:
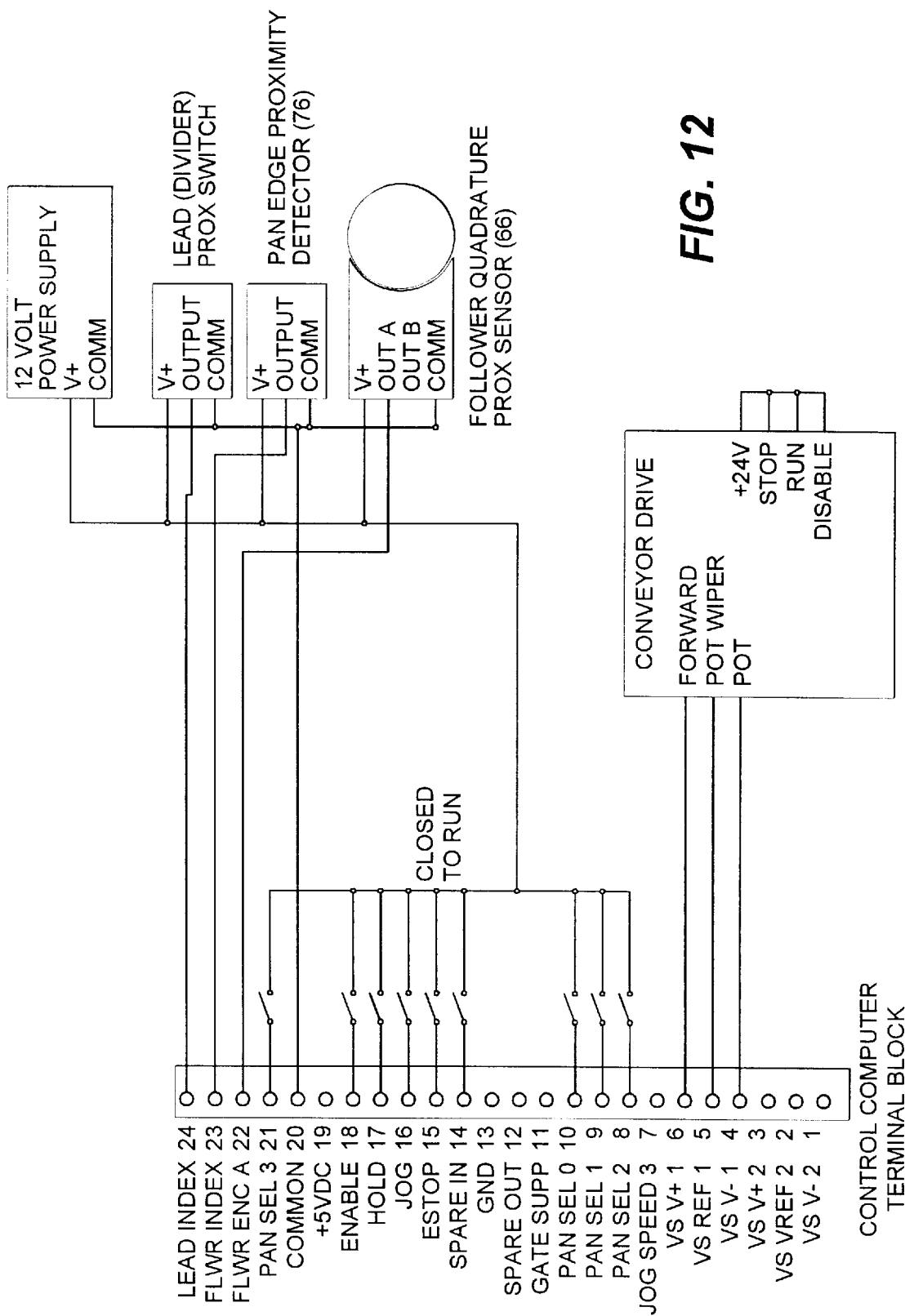
FIG. 12 is an electrical diagram of the control system.

In order to control the varying velocity of the bakery pans 10, the speed of operation of dough divider 23 is monitored, and the speed of the pan indexer 36 is adjusted so as to correspond to the speed of the dough divider 23 but is adjusted as necessary to present the pan cavities 12 at the dough ball delivery station at the right times. As shown in FIG. 10, the motor 51 of the magnetic conveyor is equipped with a proximity counter 66 that counts the movement of the teeth of the gear 68 over a period of time and functions as an encoder. The signals from the proximity counter 66 (FLWR ENC A) are communicated to a computer (FIG. 12). A suitable computer for the system is a Sensor Systems Technology DCMP1090 Motion Profiler. This detects the speed of operation of the pan indexer motor 51. Likewise, a similar proximity counter (not shown) is mounted to another rotary component (not shown) of the divider 22 so as to detect when the divider blades 24 are in their fully up position, indicating the beginning of a cycle of operation of the divider, and is used to detect the speed of operation of the divider 23. This information is also communicated to the computer. The position of the leading edges of the bakery pans 10 moving along the pan indexer 36 is transmitted by proximity switch 66 or 76 (FIGS. 3 and 6) to the computer. With the above noted inputs, the computer uses an algorithm to calculate the speed required for the pan indexer to move the next oncoming empty dough receiving cavity 12 to the dough ball delivery station 37.

In this case, the parameter to be calculated is the conveyor motor variable speed drive reference voltage Vref, which is fed to and controls the inverter 52 or 59, and is described by the following equation:

$$Vref = (Vslow) + (Vshi - Vslow) \cdot \int_0^T (LEAD\_IGAIN \cdot Rtimer(t) - FLWR\_IGAIN \cdot Vconveyer(t))dt$$

where,
Vref=Conveyor motor variable speed drive reference voltage,
Vslow=Low reference limit from VS drive,
Vshi=High reference limit from VS drive,
FLWR_IGAIN=Follower (pan conveyor) integral gain factor,
LEAD_IGAIN=Lead (internal timer) integral gain factor,
Rtimer(t)=Internal timer pulse rate calculated from Lead index pulse period,
Vconveyor=Pan conveyor velocity given in encoder pulses per second.

This is a standard integral control algorithm. The follower integral gain, FLWR_IGAIN, is re-calculated each time a lead index or divider blade 24 pulse is detected. This calculation is based on the position of the pan at that moment as well as the value in a set of programmable tables as shown in FIGS. 11A–11C.

The computer is programmed to correspond with the types of pans 10 that are to be used in the dough processing system. For example, some of the pans may have their dough receiving cavities equally spaced along the lengths of the pans, whereas other pans will have the dough receiving cavities formed in clusters of four, as shown in FIG. 1. Further, some pans will have a larger distance between the leading and trailing dough receiving cavities of adjacent pans. Also, the computer must control pan movement from one cavity to the next cavity, without regard to the fact that some cavities are in one pan and other cavities are in the next adjacent pan. Therefore, the spacing between adjacent cavities of adjacent pans must be compensated for by the computer and this information for each type of pan is entered into the program before the system is operated. In practical use, the computer is programmed with as many as sixteen bakery pan configurations or "profiles" so that the operator can select one of the sixteen preprogrammed pan configurations without being required to input to the computer the specifications of the type of pan that is about to be used in the dough processing system. This allows the operator of the system to change from one type of baking pan to another without having to enter the pan specifications into the program.

The computer sends its control signal to the inverter 52 and the inverter 52 controls the speed of motor 51 of the pan indexer 36. The inverter is a standard variable frequency controller, such as a Toshiba brand transistor inverter, Tosvert-130. The motor 51 of the pan indexer is a three phase induction motor with reduction gears, Nord brand SK 9022 AZD. It is anticipated that other brands and models of the inverter and electric motor can be used, as may be desired as a variable speed drive means for the pan indexer.

Figure 11A:
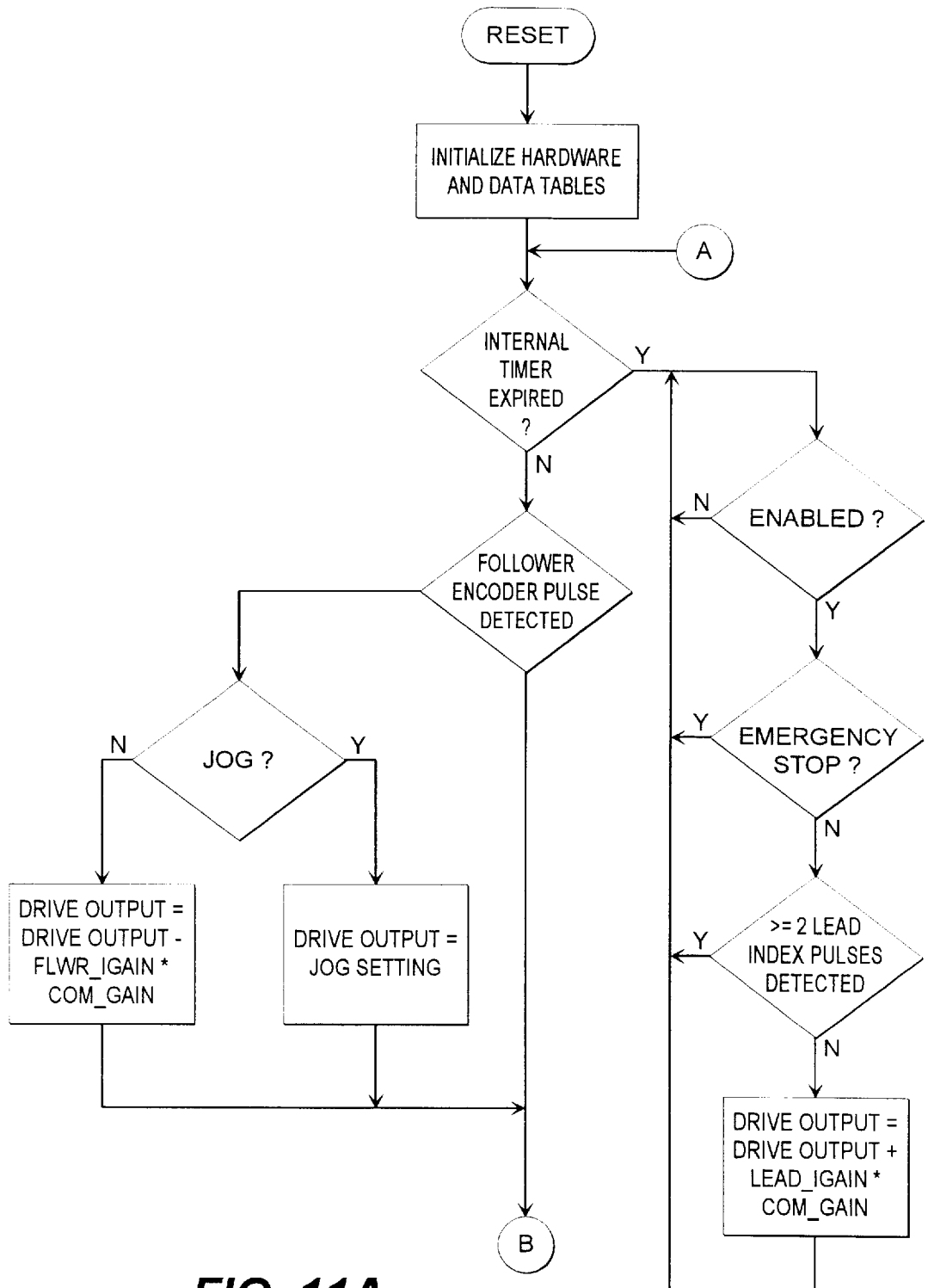
FIGS. 11A, 11B and 11C are a flow chart of the sequence operation of the system.
Figure 11B:
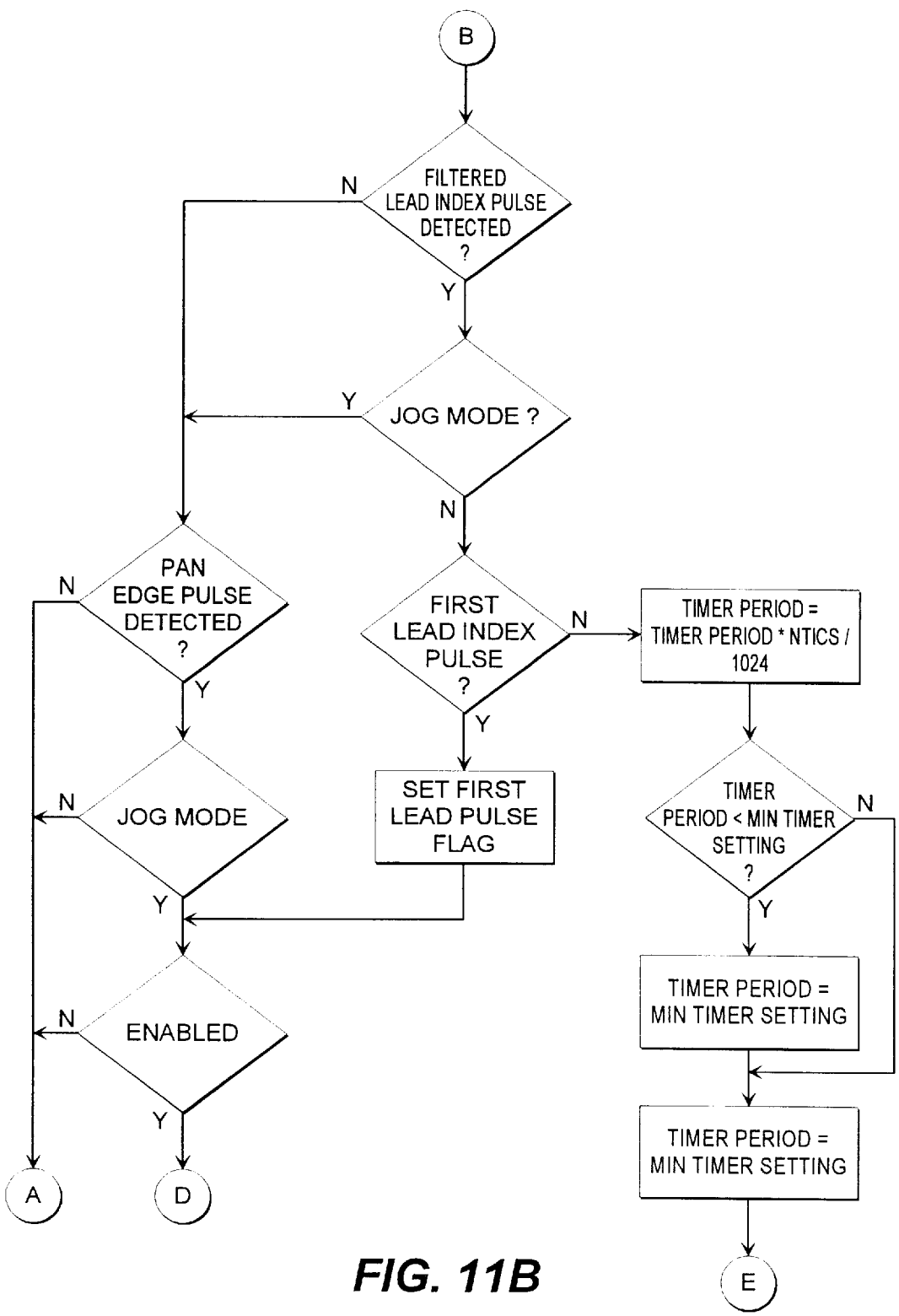
Figure 11C:
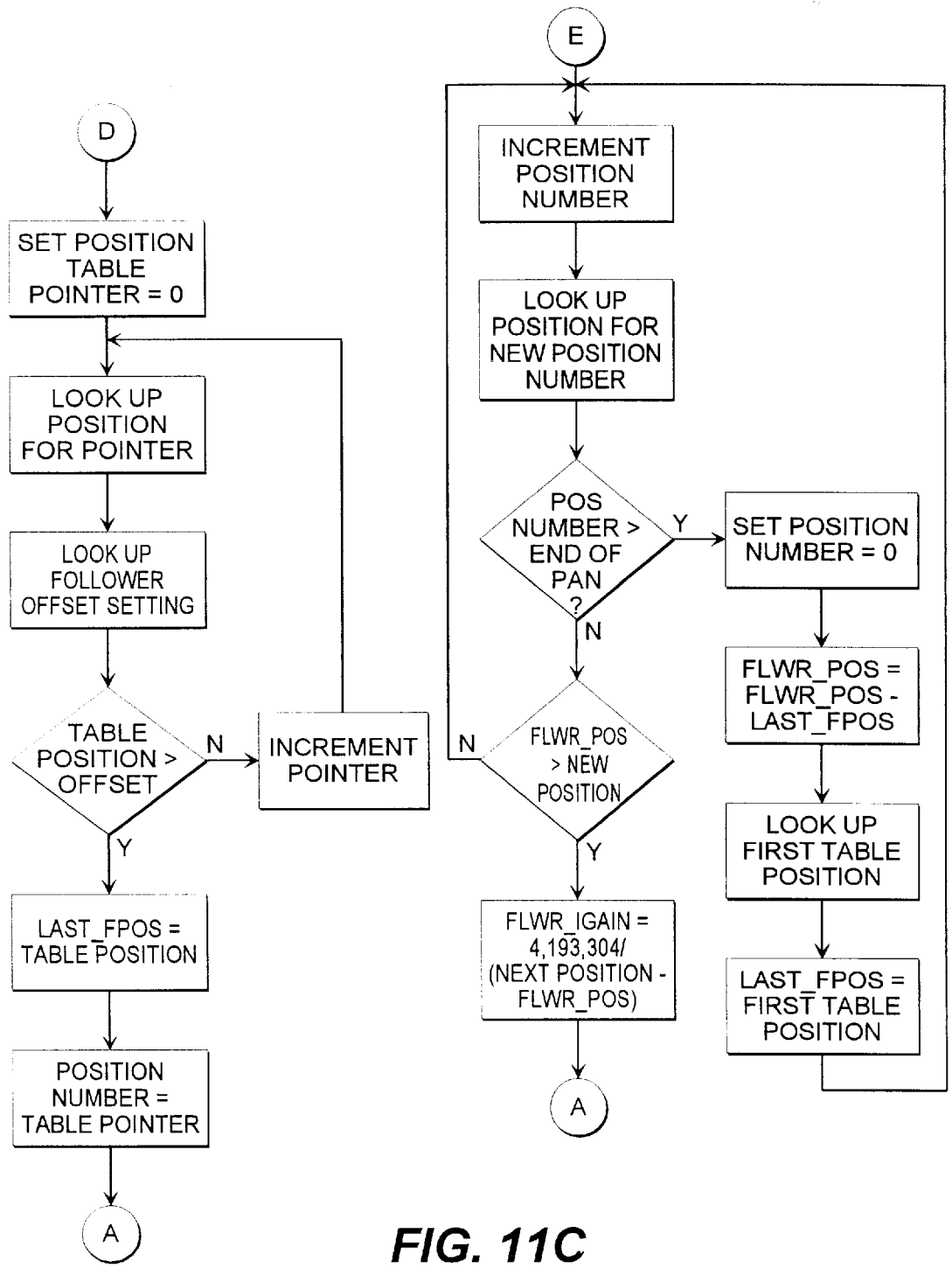

The definitions for the pan indexing control algorithm flow chart, FIGS. 11A–11C is:

| | |
|---|---|
| Jog Setting | The speed selected for the pan conveyor the run when Jog mode is selected. |
| Drive Output | The analog voltage output to the variable speed pan conveyor motor drive. |
| FLWR_IGAIN | The integral gain factor used to decrease the Drive Output each time a follower (pan conveyor) encoder pulse is detected. |
| LEAD_IGAIN | The integral gain factor used to increase the Drive Output each time the internal timer expires. |
| COM_GAIN | The common gain factor multiplied by both the LEAD_IGAIN and FLWR_IGAIN factors to control conveyor response. |
| Timer Period | The period of the controllers internal timer. This timer is used to simulate "Lead motor" encoder pulses. |
| Position Table | The table of pan load positions measured in conveyor encoder pulses relative to the last load position of the previous pan. |
| Position Table Pointer | A temporary pointer used to index through the Position Table. |
| Position Number | An integer representing the load position in a given pan relative to the first load position. |
| FLWR_POS | The number of encoder pulses the pan has traveled since the last load position in the previous pan. |
| LAST_FPOS | This register is used to store the pan position corresponding to the previous Position Number. |

While an a.c. motor and inverter are disclosed as providing a variable speed drive means for the pan indexer, a d.c. motor can be substituted if desired.

The circuit diagram for the system is shown in FIG. 12. The divider index pulse is connected to an analog input on the control computer which is programmed as a limit comparator. This limit comparator detects edges in the master index pulse and accurately measures the time between the leading edges of this pulse. This time measurement is then used to calculate the rate of an internal timer counter such that one thousand twenty four (1024) pulses are generated for every pulse on the divider index input as shown in FIG. 11B. The output of this internal counter timer is then used as the master time base for the motion profiler. The motion profile sequence is then produced in the following fashion: On each timer tick of the internal timer counter the value of the lead integral gain, LEAD_IGAIN multiplied by the common gain coefficient is added to the Variable speed drive output level as shown in FIG. 11A. Feedback from the conveyor motor 51 is provided via a motor mounted encoder 66 whose signals are also connected to an analog input, FLWR ENC A which is programmed as a limit comparator. Upon detection of a pulse edge from the follower encoder, the last calculated value of the follower integral gain, FLWR_IGAIN is multiplied by the common gain and then subtracted from the Variable speed drive output level as also shown in FIG. 11A. This algorithm then produces a motion profile on the follower (conveyor) motor which places a programmed conveyor position at the load station each time the divider input index signal is detected. When an edge is detected on the divider index pulse a conveyor position is read from the next location in the table corresponding to the selected pan type as shown in FIG. 11C. The current position of the conveyor is then subtracted from the value read from the table. This difference is used to calculate the follower integral gain coefficient FLWR_IGAIN.

In addition to the follower encoder input signal, an input is also provided for a pan edge pulse from proximity detector 66. This pulse is used to reset the pan conveyor position counter to the value stored by the user in the pan offset register for the selected pan type. When a pulse edge is detected on the follower index pulse, the pan offset value is copied to the pan position counter and the position number (table index pointer) is set to the value which points to a conveyor position just beyond the offset value as shown in FIGS. 11B and 11C.

It will be understood that the foregoing relates only to a preferred embodiment of the present invention, and it is anticipated that numerous changes and modifications may be made therein without departing from the spirit and scope of the invention as set forth in the following claims.

We claim:

1. In a process of delivering dough pieces into dough receiving cavities of bakery pans, comprising:
    moving the bakery pans in end-to-end abutment along a pan path toward a cooking oven, said bakery pans having rows of dough receiving cavities at intervals of both equal and unequal spacing between the rows of cavities along the length of the pan path;
    dividing dough pieces from a mass of dough;
    moving the dough pieces along a dough processing line in multiple columns extending along the processing line and in lateral rows extending across the processing line and rounding the dough pieces into dough balls;
    delivering the rows of the dough balls at a dough delivery station along the pan path at predetermined time intervals;
    maintaining the dough pans in continuous abutting movement along the pan path through the dough delivery station;
    increasing or decreasing the velocity of the bakery pans along the pan path in response to the differences in distance between the rows of dough receiving cavities of the bakery pans from one row of cavities to the next row of cavities to move the rows of dough receiving cavities through the dough delivery station in a timed relationship corresponding to the time when the dough balls are delivered to the dough delivery station; and
    depositing the rows of dough balls in the rows of dough receiving cavities of the bakery pans as the bakery pans move continuously through the delivery station.

2. The process of claim 1 wherein the step of maintaining the bakery pans in continuous movement along the pan path comprises placing the bakery pans on a surface conveyor and continuously advancing the surface conveyor, and wherein the step of increasing or decreasing the velocity of the bakery pans along the pan path comprises increasing or decreasing the velocity of the continuously moving surface conveyor.

3. The process of claim 2 wherein the step of placing the bakery pans on a surface conveyor comprises placing the bakery pans on an indexing conveyor having a plurality of magnets moveable thereon, and wherein the bakery pans are constructed of a ferrous material and cling to the magnets of the indexing conveyor, and moving the bakery pans in unison with the indexing conveyor through the dough delivery station.

4. The process of claim 1 wherein the step of moving the bakery pans in end-to-end abutment along a pan path comprises moving the bakery pans on a surface conveyor along the pan path and on to a second surface conveyor having a magnetized conveyor surface, and wherein the steps of maintaining the bakery pans in continuous abutting movement along the pan path and increasing or decreasing the velocity of the bakery pans along the path comprise adhering the bakery pans to the magnetized conveyor surface and increasing or decreasing the velocity of the magnetized conveyor surface.

5. The process of claim 1 wherein the step of increasing or decreasing the velocity of the bakery pans along the pan path in response to intervals in spacing between rows of cavities from one row of cavities to the next row of cavities comprises:
    determining the distances between the cavities along the columns of cavities from cavity to cavity of each bakery pan and from cavity to cavity of adjacent bakery pans;
    detecting the leading edge of each bakery pan as each bakery pan moves along the pan path; and moving each bakery pan at a velocity corresponding to:

$$Vref = (Vslow) + (Vshi - Vslow) \cdot \int_0^T (LEAD\_IGAIN\_Rtimer(t) - FLWR\_IGAIN * Vconveyer(t))dt$$

where,
Vref=Conveyor motor variable speed drive reference voltage,
Vslow=Low reference limit from VS drive,
Vshi=High reference limit from VS drive,
FLWR_IGAIN=Follower (pan conveyor) integral gain factor,
LEAD_IGAIN=Lead (internal timer) integral gain factor,
Rtimer(t)=Internal timer pulse rate calculated from Lead index pulse period, Vconveyor=Pan conveyor velocity given in encoder pulses per second.

6. A process of controlling the velocity of bakery pans moving continuously along a surface conveyor, the bakery pans having dough receiving cavities formed at intervals therein for receiving dough balls from a dough processing line, said surface conveyor including a three phase electric motor for driving a continuous conveyor surface, and an inverter for controlling the speed of operation of said motor, and said dough processing line including a dough divider for dividing dough pieces from a mass of dough and dough conveyor means operated at a velocity corresponding to the speed of the dough divider, the process comprising:

detecting the speed of operation of the dough divider;
  detecting the beginning of each cycle of operation of the dough divider;
  detecting the position of the leading edge of each bakery pan as the bakery pans move along the surface conveyor;
  adjusting the speed of the operation of said conveyor motor by providing a control signal to said inverter with:

$$Vref = (Vslow) + (Vshi - Vslow) \cdot \int_0^T (LEAD\_IGAIN\_Rtimer(t) - FLWR\_IGAIN * Vconveyer(t))dt$$

where,
  Vref=Conveyor motor variable speed drive reference voltage,
  Vslow=Low reference limit from VS drive,
  Vshi=High reference limit from VS drive,
  FLWR_IGAIN=Follower (pan conveyor) integral gain factor,
  LEAD_IGAIN=Lead (internal timer) integral gain factor,
  Rtimer(t)=Internal timer pulse rate calculated from Lead index pulse period,
  Vconveyor=Pan conveyor velocity given in encoder pulses per second.

7. A process of controlling the velocity of a series of bakery pans moving along a pan surface conveyor, past a dough delivery station, the bakery pans having rows of dough receiving cavities formed therein at unequal intervals along the surface conveyor for receiving dough balls from the dough delivery station, the process comprising:

increasing the frictional contact between the bakery pans and the conveyor surface as the bakery pans move through the dough delivery station,
  continuously moving the bakery pans in unison with the conveyor surface through the dough delivery station, and
  accelerating or decelerating the bakery pans in unison with the conveyor surface as the bakery pans move through the dough delivery station in response to the distances between the rows of dough receiving cavities in the series of bakery pans.

8. The process of claim 7 wherein said pan surface conveyor includes a continuous belt conveyor, an electric motor for driving said continuous belt conveyor, an inverter for controlling the speed of operation of said motor, and wherein the step of accelerating or decelerating the bakery pans in unison with the conveyor surface comprises varying the output of the inverter to the motor.

9. The process of claim 8 wherein the step of increasing the frictional contact between the bakery pans and the conveyor surface comprises urging the bakery pans with magnetic force toward said conveyor surface.

10. The process of claim 9 wherein the step of urging the bakery pans with magnetic force toward said conveyor surface comprises progressively increasing the magnetic force applied to the bakery pans as the bakery pans approach the dough delivery station and progressively decreasing the magnetic force applied to the bakery pans as the bakery pans move beyond the dough delivery station.

11. The process of claim 9 wherein the step of urging the bakery pans with magnetic force toward the conveyor surface comprises moving the conveyor surface across magnets positioned beneath the conveyor surface, and attracting the bakery pans with the magnets toward the conveyor surface.

12. Apparatus for delivering rows of laterally advancing dough balls into rows of dough receiving cavities of a series of laterally advancing bakery pans in end-to-end abutment along a path through a dough delivery station, wherein the rows of cavities are unequally spaced apart along the path, said apparatus comprising:

a magnetic conveyor including magnet means for urging the bakery pans into firm positions on said magnetic conveyor and inducing the bakery pans to move in unison with said magnetic conveyor,
  a variable speed motor constructed and arranged for continuously moving said magnetic conveyor to continuously advance the cavities at a lateral velocity substantially equal to the lateral velocity of the dough balls, and
  speed control means for varying the speed of operation of said motor in response to the differences in the distances between the rows of dough receiving cavities approaching said dough delivery station.

13. The apparatus of claim 12 wherein said motor is an induction motor, and wherein said speed control means comprises an inverter for varying the speed of said motor.

14. The apparatus of claim 12 wherein said magnetic conveyor comprises a magnet support table, a plurality of permanent magnets supports in stationary positions on said support table, a magnets cover extending over said magnets, and a flexible conveyor belt movable in sliding contacting relationship over said magnets cover.

15. The apparatus of claim 14 wherein said flexible conveyor belt includes a first surface facing said magnets cover and a second surface facing away from said magnets cover, and wherein said first surface is formed to reduce the sliding friction between said belt and said magnets cover, and wherein said second surface is formed to increase the sliding friction between said belt and said bakery pans.

16. The apparatus of claim 14 wherein said magnets cover comprises sheet material including an array of protrusions extending toward said flexible conveyor belt for sliding engagement by said flexible conveyor belt.

17. The apparatus of claim 12 wherein said magnetic conveyor comprises a flexible conveyor belt having an upper run, and a plurality of magnets supported beneath said upper run.

18. The apparatus of claim 12 wherein said magnetic conveyor comprises a flexible conveyor belt, and permanent magnets affixed to said conveyor belt.

19. The apparatus of claim 13 further including a dough divider for dividing dough pieces from a mass of dough and arranging the dough pieces in columns and rows, rounder bars for forming the dough pieces into dough balls, and wherein said speed control means comprises means for detecting the speed of operation of said dough divider, means for detecting the beginning of each cycle of operation of said dough divider, and means for detecting the position of the leading edge of each bakery pan as the bakery pans move along said magnetic conveyor, and means for adjusting a signal from said inverter to said motor in accordance with:

$$Vref = (Vslow) + (Vshi - Vslow) \cdot \int_0^T (LEAD\_IGAIN\_Rtimer(t) - FLWR\_IGAIN * Vconveyer(t))dt$$

where,
- Vref=Conveyor motor variable speed drive reference voltage,
- Vslow=Low reference limit from VS drive,
- Vshi=High reference limit from VS drive,
- FLWR_IGAIN=Follower (pan conveyor) integral gain factor,
- LEAD_IGAIN=Lead (internal timer) integral gain factor,
- Rtimer(t)=Internal timer pulse rate calculated from Lead index pulse period,
- Vconveyor=Pan conveyor velocity given in encoder pulses per second.

* * * * *